July 7, 1959  C. A. ECARY  2,893,248
DEVICE FOR INDICATING THE TRUE VERTICAL
Filed Dec. 16, 1957  2 Sheets-Sheet 1

July 7, 1959            C. A. ECARY            2,893,248

DEVICE FOR INDICATING THE TRUE VERTICAL

Filed Dec. 16, 1957                         2 Sheets-Sheet 2

United States Patent Office 2,893,248
Patented July 7, 1959

2,893,248

DEVICE FOR INDICATING THE TRUE VERTICAL

Charles Auguste Ecary, Paris, France, assignor to Société Commerciale Eca, Asnieres, France Application December 16, 1957, Serial No. 703,172

10 Claims. (Cl. 74—5.34)

This invention relates to a device designed to indicate in a moving vehicle the true vertical of a place where this vehicle is passing, that is, the direction of the attraction of the earth and, if necessary, to permit the maintenance in a horizontal position of a platform or table mounted on said moving vehicle, irrespective of the places where this vehicle is passing and independently of its evolutions.

It is already known that when a vehicle is subjected to accelerations other than that of gravity, the desired result can be obtained with precision by detecting these accelerations and, after having integrated them twice, utilizing the resulting divergence or displacement signal for angularly shifting a platform or table about an axis at right angles to the direction of these accelerations, with the adequate gain, the ratio of the angular shift of the platform to the divergence resulting from the double integration being selected to be equal to the inverse of the radius of the earth according to Schuler's condition.

The platform or table is thus comparable with a pendulum having a proper period of 84′20″, that is, a period of a simple pendulum having the same length as the radius of the earth, and is constantly oriented according to the horizontal irrespective of the accelerations impressed to its support, that is, independently of the evolutions performed by the vehicle.

In order to comply with the conditions set forth hereinabove, it is the essential object of the present invention to provide a device for indicating the true vertical of a place on board a vehicle performing evolutions, this device comprising a platform pivotally mounted about two axes set at right angles to each other and parallel to the tangents at this place to two orthogonal terrestrial characteristic circles respectively, such as two orthogonal terrestrial great circles, or the parallel and meridian of the place concerned, said platform being associated with a device for maintaining a fixed course by pivoting about a third axis at right angles to the other two axes, said platform supporting two simultaneous units for detecting and twice integrating the accelerations imparted to the table support by the evolutions of the vehicle in directions parallel to the tangents at this place to the two characteristic circles respectively, and means for angularly shifting said platform about each of said first two axes as a function of the divergences or displacements shown by the corresponding simultaneous detecting and double integrating unit, the proportion between each angular shifting and the corresponding divergence being equal to the inverse of the radius of the earth.

According to an advantageous form of embodiment of the invention, each simultaneous detecting and double integrating unit comprises a gyroscope having two degrees of free action and its rotor trunnioned on a horizontal axis parallel to the tangent at the place to the corresponding characteristic circle in a balanced vertical frame parallel to this axis and trunnioned in turn about a vertical axis in another vertical frame at right angles to this horizontal axis with the interposition of a return device, this other vertical frame pivoting about a horizontal axis at right angles to the first horizontal axis and being unbalanced by any known and suitable acceleration-responsive means.

The return device may be magnetic, electrical or mechanical and in this last case it may consist preferably of a spiral spring.

Other features and advantages of the present invention will appear in the following description with reference to the accompanying drawings in which a few typical examples of the manner in which the invention may be embodied are shown diagrammatically. In the drawings.

Figure 1:
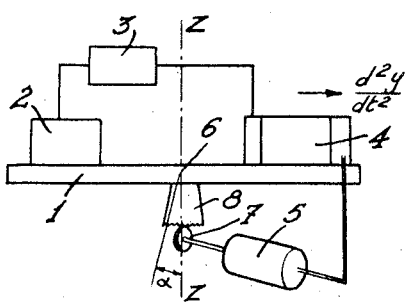
Figure 1 illustrates dagrammatically a platform to be maintained in the horizontal position, and the means utilized to this end which are based on the method of the two successive acceleration integrations.

In the arrangement illustrated in Fig. 1 it is assumed that the platform or table 1 is moving along a great terrestrial circle T contained in the plane of the figure (Figure 3), and it is desired that the perpendicular ZZ to this table remains coincident with the vertical of the place where this table is passing. To this end, according to the conventional process, the accelerations $$\frac{d^2y}{dt}$$

are detected by means of an accelerometer 2 and integrated a first time by an integrating device 3 giving a signal $$\frac{dy}{dt}$$

fed to a motor 4a applying a torque to an integrating gyrometer or gyroscope having one degree of free action. This gyrometer produces an angular shifting and delivers a signal $y$ fed to the motor 5 to control the angular movement of the table 1 about its axis 6 through the medium, for example, of a pinion 7 meshing with a toothed sector 8.

A state of equilibrium is obtained when the torque delivered by the motor 4a to the integrating gyrometer 4 is equal to the precession of the rotor of this gyrometer which results from the rotation of the table about the axis 6, that is, when $$h\frac{d\alpha}{dt} = k\frac{dy}{dt} \text{ or } h\alpha = ky$$

where $h$=the kinetic moment of the rotor of the gyrometer,
$k$=a constant of the servo-mechanism, $$\frac{d\alpha}{dt}$$

and $\alpha$=the velocity and the angular divergence or displacement of the table.

Consequently, the angle $\alpha$ is proportional to $y$ which is the displacement of the vehicle along the great circle T, during which the vertical has moved through an angle $$\frac{y}{R}$$

Figure 3:
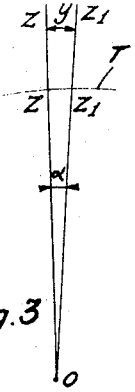
Figure 3 illustrates the operation of the device shown in Fig. 2 and mounted on a vehicle moving in relation to the earth surface.

R being the radius of the earth (Fig. 3).

By so selecting the parameters $k$ and $h$ that $$\frac{k}{h} = \frac{1}{R}$$

we obtain $$\frac{1}{R} = \frac{\alpha}{y}$$

This is the Schuler's condition for which the proper period of the system is of 84′20″, that is, the period of a simple pendulum having the length of the radius of the earth. This pendulum would constantly give the direction of the center of the earth independently of the accelerations applied to its support. Consequently, the table 1 is constantly directed according to the vertical of the place where it passes, independently of the evolutions of the structure or vehicle supporting this table in the plane of the great terrestrial circle contemplated.

Figure 2:
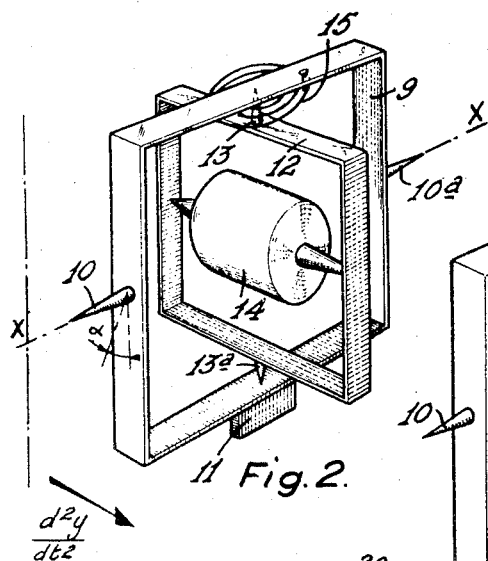
Figure 2 is a perspective view showing a simultaneous unit for detecting and twice integrating accelerations, which is constructed according to the present invention.

In the form of embodiment illustrated in Fig. 2, the simultaneous detecting and double integrating unit comprises a gyroscope having two degrees of free action and a main frame 9 pivoted at 10 and 10a about an axis XX perpendicular to the accelerations $$\frac{d^2y}{dt^2}$$

This gyroscope is unbalanced by means of a mass 11 placed on the frame 9. The inner frame 12 is pivoted at 13 and 13a on the main frame 9 about an axis disposed at right angles both to the axis XX and to the accelerations. The gyroscopic rotor 14 carried by the inner frame 12 pivots about an axis parallel to the accelerations. A return device connects the inner frame 12 to the outer frame 9 and may consist of a spiral spring 15 or any other similar and convenient means, for example a torque-motor or a torque-generating motor.

Any acceleration $$\frac{d^2y}{dt}$$

produces a torque applied to the main frame 9 about the axis 10—10a and therefore, by precession, a torque applied to the inner frame 12 about the axis 13—13a, which results, due to the elastic return action exerted by the spiral 15, into another torque applied to the main frame 9 about the axis 10—10a. Thus, a double gyroscopic integration is obtained. The angle of rotation $\alpha$ resulting from this action as far as the main frame 9 is concerned is proportional to the distance $y$ of the displacement accomplished.

Under these conditions, the Schuler's condition must be complied with, that is, the equality $$\frac{1}{y} = \frac{1}{R}$$

must be obtained. Thus, as shown in Fig. 3, the displacement $y$ corresponds to the arc through which the vehicle has moved along the surface T of the earth, the straight line O ZZ having moved to O $Z_1Z_1$ and indicating the exact vertical of the place. To comply with this requirement, by properly selecting the parameters, the period of the device, which is given by the formula $$T = \frac{2\pi h}{\sqrt{rmlg}}$$

is made equal to 84′20″; in this formula, $h$ is the kinetic moment of the gyroscope, $r$ the return force applied by the spiral spring 15, $m$ the unbalance mass 11 and $l$ the distance measured from this mass 11 to the axis XX.

Thus, an accurate device is obtained which requires no erector, as in the case of conventional vertical-indicating gyroscopes.

The angle of rotation of the inner frame 12 about the axis 13, 13a under the impulse of the precession torque is proportional to the velocity of movement $$\frac{dy}{dt}$$

Figure 4:
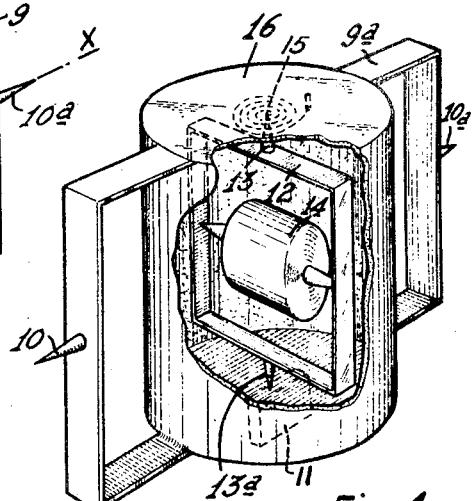
Figures 4 and 5 illustrate two modified embodiments of the simultaneous unit for detecting and twice integrating accelerations of Fig. 2.

This signal must be very pure and calculus will prove that the precision of the device increases as the friction decreases in the bearings of the inner frame 12. To this end, any known means may be used. Thus, as shown in Fig. 4, the inner frame 12 carrying the gyroscopic rotor 14 is immersed in a liquid filling a container 16 solid with the main frame 9a. As the center of gravity of the movable assembly 12, 14 is coincident with its pivot axis 13, 13a together with the center of thrust of the displaced liquid, the unballasting action resulting from the Archimedean buoyancy law reduces the pressure exerted by this assembly on the bearings and therefore the friction losses.

Figure 5:
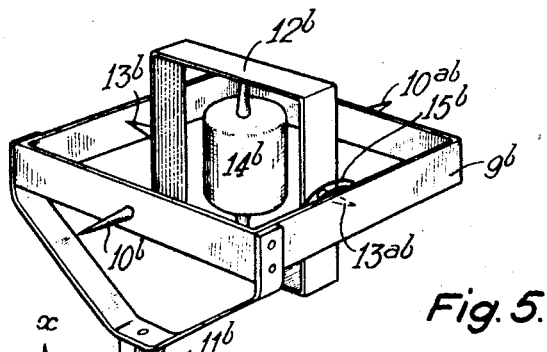

In view of reducing friction losses it is also possible to utilize the embodiment illustrated in Fig. 5 which is based on the fact that friction losses are minimum in ball-bearings when radial efforts are applied thereto. In this figure, the rotor 14b is trunnioned about a vertical axis in the vertical frame 12b balanced and parallel to the tangent at the locus to the corresponding caracteristic circle. This vertical frame 12b is trunnioned in turn about a horizontal axis 13b, 13ab parallel to this tangent in a horizontal frame 9b provided with an unbalancing counterweight 11b, a return spring 15b being interposed as in the preceding case. The horizontal frame 9b pivots about a horizontal axis 10b, 10ab at right angles to the first horizontal axis 13b, 13ab.

Figure 6:
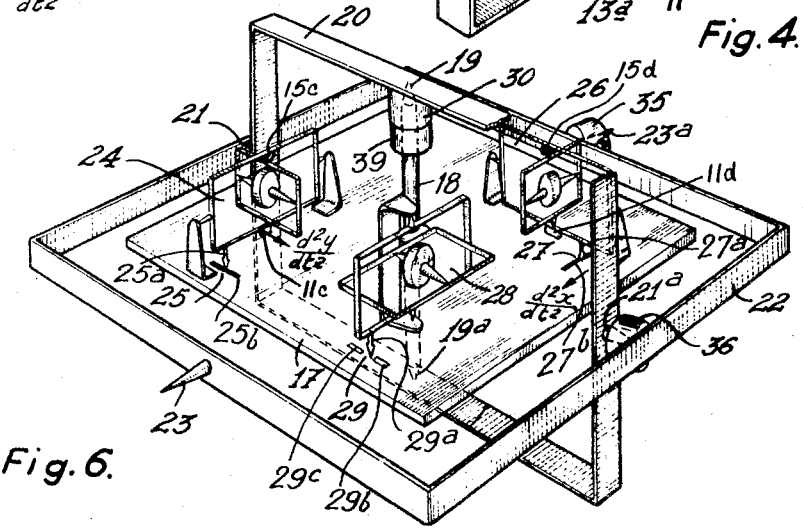
Figure 6 illustrates a complete vertical-indicator according to this invention.

When the vehicle equipped with the device for indicating the true vertical is caused to perform any evolutions on the surface of the earth, the complete vertical device illustrated in Fig. 6 is used wherein one element exerts a correcting action along the terrestrial parallel while another element exerts a correcting action along the terrestrial meridian.

This device comprises a table 17 to be kept horizontal and provided with a shaft 18 at right angles thereto which must therefore remain vertical. This table, as already stated, is equipped with two correcting chains acting respectively along the terrestrial meridian and parallel. It is necessary, on the one hand, to avoid any coupling between these chains and, on the other hand, to maintain the direction of action of each chain along the terrestrial meridian or parallel. To this end, the shaft 18 is pivoted at 19, 19a on a vertical frame 20 pivoted in turn at 21, 21a on a horizontal frame 22 pivoted at 23, 23a on the support of the device, not shown.

The table 17 carries a first elementary chain 24 having the structure of the device shown in Fig. 2 and therefore a mass 11c and a spiral spring 15c, and which, from the detections of accelerations $$\frac{d^2y}{dt^2}$$

delivers at its output end 25, shown diagrammatically in the form of a sliding contact 25a associated with a potentiometer 25b a measure of the displacements y or the angular displacements relative to the vertical, which amounts to the same thing as already explained hereinabove.

The table 17 carries another elementary chain 26 having substantially the same structure as the device illustrated in Fig. 2 and therefore with a mass 11d and a spiral spring 15d, but with its elements disposed at right angles to those of the chain 24. This chain 26 delivers, from the detections of accelerations $$\frac{d^2x}{dt^2}$$

at its output 27 shown in the form of a sliding contact 27a associated with a potentiometer 27b, a measure of the divergences x in the plane at right angles to the displacements y of the pivoting axis 18 of the table relative to the vertical.

Finally, the table carries a gyroscopic directional device 28 adapted to maintain the axes of action of the two chains parallel to the tangents at the locus to the terrestrial parallel and meridian by exerting a servo-action on the course of the vehicle. The output 29 of this directional device, which is shown diagrammatically in the form of a sliding contact 29a associated with two contact bands 29b and 29c, gives an indication of the course $\psi$. These data are transmitted in the conventional and known manner to a motor member 30 in order to keep the table in a fixed course.

Figure 9:
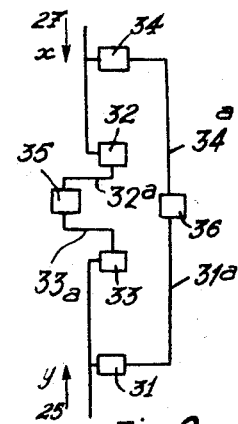
Figure 9 is a block diagram illustrating the connections between the correcting members.

The data obtained at the outputs 25 and 27 of the two elementary chains are transmitted through sine distributors 31 and 32 (Fig. 9), and cosine distributors 33 and 34 controlled from the directional device 28 and conductors 31a, 32a, 33a and 34a, to motors or driving members 35 and 36 acting on the frames 22 and 20 respectively, the motor 35 operating as a function of the displacement y and the motor 36 as a function of the divergence x. The table 17 is thus constantly kept in a horizontal position and properly directed as to its course, irrespective of the evolutions performed by its support.

Figure 7:
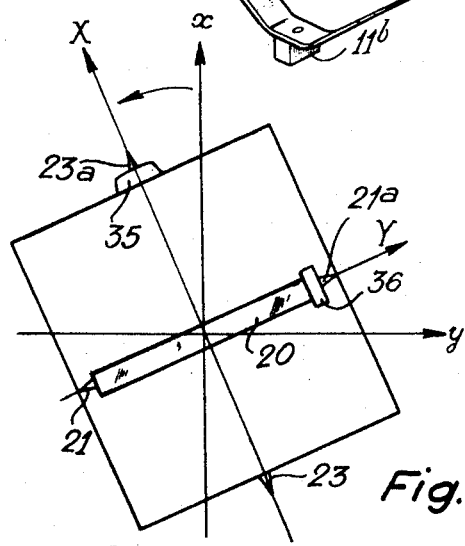
Figure 7 is a diagram for determining the control actions to be applied to the vertical-indicator of Fig. 6 when the vehicle forms an angle with a given reference course.

The complete vertical device is pivoted at 23, 23a on the longitudinal axis of the vehicle. If this axis forms an angle $\psi$ with the course reference given by the directional device 28, the North course for example (see Fig. 7), this angle is materialized by the angle through which the table has moved about the shaft 18. The outputs 25 and 27 deliver, in the form of movements of the sliding contacts 25a and 27a on the corresponding potentiometers 25b and 27b, an indication of the displacements y and x of the table 17 relative to the vertical. Considering the angular shift $\psi$, the motors 35 and 36 must be controlled respectively at Y and X so that $$Y = y \cos \psi + x \sin \psi$$
$$X = x \cos \psi - y \sin \psi$$

Figure 8:
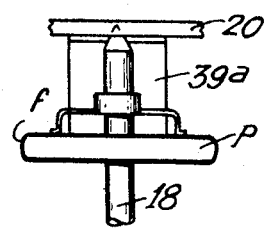
Figure 8 is a diagrammatic illustration showing the mounting of a sine cosine potentiometer.
Figure 10:
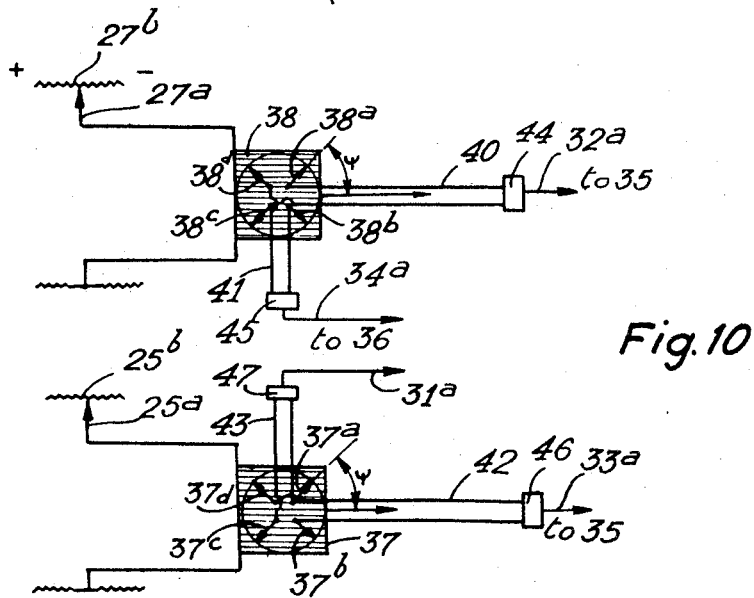
Figure 10 is a wiring diagram illustrating the electrical circuit arrangement of the device illustrated in Fig. 6.

These control actions are obtained for example according to the diagram of Fig. 10 through the medium of two sine cosine potentiometers 37, 38 solid with the frame 20 and engaged by four sliding contacts insulated from one another, spaced 90° apart and secured on shaft 18, the sliding contacts 37a to 37d co-acting with the potentiometer 37 whilst the other sliding contacts 38a to 38d superposed to the formers co-act with the potentiometer 38; this contact and potentiometer assembly is enclosed in a case 39 (see Fig. 6). Each potentiometer 37 or 38 as shown in Fig. 8 comprises a parallelepipedic body p on which a wire f is wound; the shaft 18 extends rotatably through this body p and the latter is secured through a fitting 39a on the frame 20.

As illustrated in the diagram of Fig. 10, the sliding contacts 38a and 38c deliver a current which is a function of $x \sin \psi$ in conductors 40, and the sliding contacts 38b and 38d deliver a current which is a function of $x \cos \psi$ in conductors 41. Similarly, sliding contacts 37a and 37c deliver in conductors 43 a current which is a function of $y \cos \psi$ and sliding contacts 37b and 37d deliver in conductors 43 a current which is a function of $y \sin \psi$.

These conductors 40, 41, 42 and 43 feed their respective currents to electron amplifiers 44 to 47. The electron amplifiers 44 and 46 supply amplified current to the armature of motor 35 and the other electron amplifiers 45 and 47 feed amplified current to the armature of motor 36; these currents are proportional to Y and X respectively, so that the velocities of the motors 35 and 36 are also proportional to these quantities Y and X in view of performing the correcting action and constantly maintaining the table 17 in a horizontal position and in the proper course irrespective of the evolutions performed by its support.

It will be readily understood by anybody conversant with the art that many modifications and alterations may be brought to the various embodiments shown and described herein, without departing from the scope of the invention as set forth in the appended claims; thus, the return device, instead of consisting of a spiral spring, may consist either of a magnetic or electrical device, or of any suitable mechanical return device.

The torque motors 35 and 36 driving the outer and inner frames 22, 20 respectively make it possible to introduce in the operation of Schuler's gyroscope various corrections as required by the conditions of the path followed by the vehicle, such as corrections concerning the Coriolis acceleration and the rotation of the earth which are subordinate to the travel course, to the latitude and to the velocity of the vehicle.

What I claim is:

1. In a device for indicating the true vertical of a place on board of a vehicle performing evolutions and of the type having a platform pivotally mounted about two axes set at right angles to each other and parallel to the lines tangent at said place to two orthogonal terrestrial characteristic circles respectively, and means for angularly displacing said platform about said two axes and, in order to maintain a fixed course, about a third axis at right angles to said two axes, the combination of two simultaneous detecting and double integrating units for detecting and twice integrating the accelerations imparted to the platform by the evolutions of the vehicle respectively along directions parallel to the lines tangent at said place to the two characteristic circles, each simultaneous detecting and double integrating unit comprising a gyroscope with two degrees of free action and having a rotor, a vertical balanced frame parallel to the line tangent at the place to the corresponding characteristic circle and pivotally carrying said rotor about an axis contained in a vertical plane parallel to said tangent line, a second frame disposed at right angles to the pivotal axis of said rotor, pivotally mounted about a horizontal axis perpendicular to said plane and pivotally carrying said vertical frame about an axis contained in said plane, a return device interposed between said frames, and acceleration-responsive means carried by said second frame for unbalancing the latter, the values of the kinetic moment of the rotor, of the return torque applied by the return device, of the acceleration-responsive means and of the distance between said acceleration-responsive means and the horizontal pivot axis of the second frame being determined in each simultaneous detecting and double integrating unit in order to obtain an inherent period equal to 84'20", and means for controlling the means for angularly displacing said platform about said first two axes in relation to the divergences indicated by the simultaneous detecting and double integrating units.

2. A device, according to claim 1, wherein the pivotal axis of the rotor is horizontal and parallel to the tangent at the place to the corresponding characteristic circle and wherein the second frame is vertical and pivotally carries the first vertical frame about a vertical axis.

3. A device, according to claim 1, wherein the pivotal axis of the rotor is vertical and wherein the second frame is horizontal and pivotally carries the vertical frame about a horizontal axis parallel to the tangent at the place to the corresponding characteristic circle.

4. A device, according to claim 1, wherein the return device consisists of a spiral spring.

5. A device, according to claim 1, wherein the return device consists of a magnetic device.

6. A device according to claim 1, wherein the return device consists of an electrical device.

7. A device, according to claim 1, wherein the acceleration-responsive means consists of a mass.

8. A device, according to claim 1, further comprising a container solid with the second frame and inside of which is pivotally mounted the vertical frame equipped with the rotor, and a liquid filling said container.

9. A device, according to claim 1, wherein the means for angularly displacing the platform about the first two axes and the means for controlling said angularly displacing means comprise two pairs of sine and cosine distributors, the distributors of said pairs being respectively connected to the outputs of the simultaneous detecting and double integrating units, two motors for angularly shifting the platform about the first two axes, respectively, each motor being connected to the sine distributor connected to the output of the unit which detects and twice integrate the accelerations along a direction parallel to the axis about which said motor angularly shifts the platform and to the cosine distributor connected to the output of the other unit.

10. A device, according to claim 1, further comprising a shaft solid with the platform and extending at right angles thereto, a vertical frame pivotally carrying said shaft, and a horizontal frame pivotally mounted about a first horizontal axis parallel to the tangent to one of the characteristic circles and pivotally carrying said vertical frame about a second horizontal axis parallel to the tangent to the other characteristic circle, and the means for angularly displacing the platform about the first two axes and the means for controlling said angularly displacing means comprise two potentiometers carried by the vertical frame, disposed around said shaft and respectively connected to the outputs of the simultaneous detecting and double integrating units, two sets of each four sliding contacts insulated from one another and spaced 90° apart, said two sets being carried by said shaft and superposed, the sliding contacts of each set engaging one of said potentiometers, four electron amplifiers, four feed lines respectively interconnecting said electron amplifiers and the four groups of diametrally opposite sliding contacts of said two sets, and two motors adapted to respectively apply a torque to said vertical and horizontal frames of the platform for rotation about their horizontal pivot axes and having armatures respectively connected to the two pairs of electron amplifiers fed from the groups of sliding contacts which are disposed at right angles to each other in each set.

References Cited in the file of this patent

UNITED STATES PATENTS

| | | |
|---|---|---|
| 2,209,735 | Lauck | July 30, 1940 |
| 2,451,230 | Lundberg | Oct. 12, 1948 |
| 2,606,448 | Norden et al. | Aug. 12, 1952 |
| 2,771,779 | Schaffer et al. | Nov. 27, 1956 |